(12) United States Patent
Loh

(10) Patent No.: US 7,176,847 B2
(45) Date of Patent: Feb. 13, 2007

(54) ELECTRONIC INTERFACE DEVICE

(75) Inventor: Weng Wah Loh, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1054 days.

(21) Appl. No.: 10/163,875

(22) Filed: Jun. 7, 2002

(65) Prior Publication Data
US 2003/0002523 A1 Jan. 2, 2003

(30) Foreign Application Priority Data
Jun. 8, 2001 (GB) .................. 0113931.0

(51) Int. Cl.
G09G 5/00 (2006.01)
(52) U.S. Cl. .................. 345/2.2; 345/3.1; 345/3.3
(58) Field of Classification Search ........... 370/467, 370/476; 345/501–503
See application file for complete search history.

(56) References Cited

U.S. PATENT DOCUMENTS

| 4,763,291 A | 8/1988 | Schwaber |
| 5,559,525 A | 9/1996 | Zenda |
| 5,799,204 A | 8/1998 | Pesto, Jr. |
| 5,943,064 A * | 8/1999 | Hong .......................... 345/546 |
| 6,150,837 A * | 11/2000 | Beal et al. ..................... 326/39 |
| 6,247,084 B1 * | 6/2001 | Apostol et al. ............. 710/108 |
| 6,646,645 B2 * | 11/2003 | Simmonds et al. ......... 345/502 |
| 6,812,930 B1 * | 11/2004 | Dowdy ........................ 345/545 |
| 6,826,776 B1 * | 11/2004 | Takano et al. ................ 725/80 |
| 2001/0008535 A1 * | 7/2001 | Lanigan ....................... 370/487 |
| 2006/0119602 A1 * | 6/2006 | Fisher et al. ................. 345/441 |

FOREIGN PATENT DOCUMENTS

WO    WO 99/66489 A1    12/1999

OTHER PUBLICATIONS

AIG Video Equipment Reviews: RCA Video Source Selector CVH920—Winter/Spring 2000. www.audio-ideas.com/reviews/video/rca_source_selector.html.*

* cited by examiner

Primary Examiner—Ricky Q. Ngo
Assistant Examiner—Warner Wong

(57) ABSTRACT

An electronic interface device includes (1) a first input receiving signals from a graphics controller of a first electronic device having a display screen, (2) a second input receiving signals form a second electronic device, (3) a multiplexer, (4) an output connected to the display screen of the first electronic device, and (5) a switch to select which input signal of the interface device is fed to the display screen.

19 Claims, 3 Drawing Sheets

ELECTRONIC INTERFACE DEVICE

RELATED APPLICATIONS

The present application is based on, and claims priority from, United Kingdom Application Number 0113931.0, filed Jun. 8, 2001, the disclosure of which is hereby incorporated by reference herein in its entirety.

BACKGROUND AND SUMMARY OF THE INVENTION

The invention relates to an electronic interface device which takes input from two electronic devices and permits the user to select which input is fed to a display screen.

Many kinds of electronic devices for use by individuals are known, such as notebook or laptop computers, personal digital assistants (PDAs) and mobile telephones. Notebook computers are designed as general purpose computing platforms, and as such include relatively large display screens and powerful multimedia computing capabilities. The multimedia computing requires a dedicated graphics processor that consumes high levels of power. Smaller application specific electronic devices such as PDAs and mobile telephones do not usually require multimedia capabilities and therefore have much smaller display screens. Low power simplified graphics processors are therefore suitable for such devices, with the advantage that the devices consume much lower levels of power, providing for much longer battery life and the use of smaller battery packs.

The small display screens on the smaller electronic devices, whilst adequate for many PIM applications, are however not ideal for all uses of such devices, for example for web browsing and note taking applications. Hence the ability to use the larger screen of the notebook computer to display the output of the smaller electronic device would in some circumstances be advantageous, and it is an object of the present invention to provide this new facility.

According to the present invention there is provided an electronic interface device characterised in that it has a first input for the receipt of signals from a graphics controller of a first electronic device having a display screen, and a second input for the receipt of signals from a second electronic device, a multiplexer, an output to the display screen of the first electronic device and switch means to select which input signal is fed to the display screen via the output.

The invention provides the advantage that the display screen of the first electronic device can be employed, to display the output from the second electronic device, without any assistance from the microprocessor or graphics controller of the first electronic device, hence saving power.

In one embodiment the electronic interface further includes a receiver, connected between the first input and the multiplexer, for conversion of input signals received from the graphics controller of the first electronic device in a first format into a second format, and a transmitter, connected between the multiplexer and the output, for conversion of the selected output signal to the first format, wherein the second input signal is received in the second format and the multiplexer operates on signals in the second format.

In an alternative embodiment the electronic interface device further includes a transmitter, connected between the second input and the multiplexer, for conversion into a first format of the input signal received from the second electronic device in a second format, wherein the first input signal is received in the first format and the multiplexer operates on signals in the first format.

Conveniently the first signal format is LVDS and the second signal format is FPL.

The electronic interface device may conveniently be implemented on a mixed signal FPGA.

The switch means within the electronic interface device is preferably implemented in software.

The electronic interface device may conveniently be implemented integrally with the first electronic device.

DESCRIPTION OF SPECIFIC EMBODIMENTS

Electronic interface devices of the figures are to interface between:

(a) a high power graphics controller (GC) 1 of a first electronic device A, such as a notebook computer, having a relatively large display screen (DS) 2 and a microprocessor (.mu.) 3;

(b) a second electronic device B, such as a personal digital assistant (PDA) or a mobile telephone, which has a lower power graphics controller (GC) 5, a much smaller display screen (DS) 6 than that of the first electronic device A, and a microprocessor (.mu.) 7, and (c) the display screen 2 of the first electronic device A.

Figure 1:
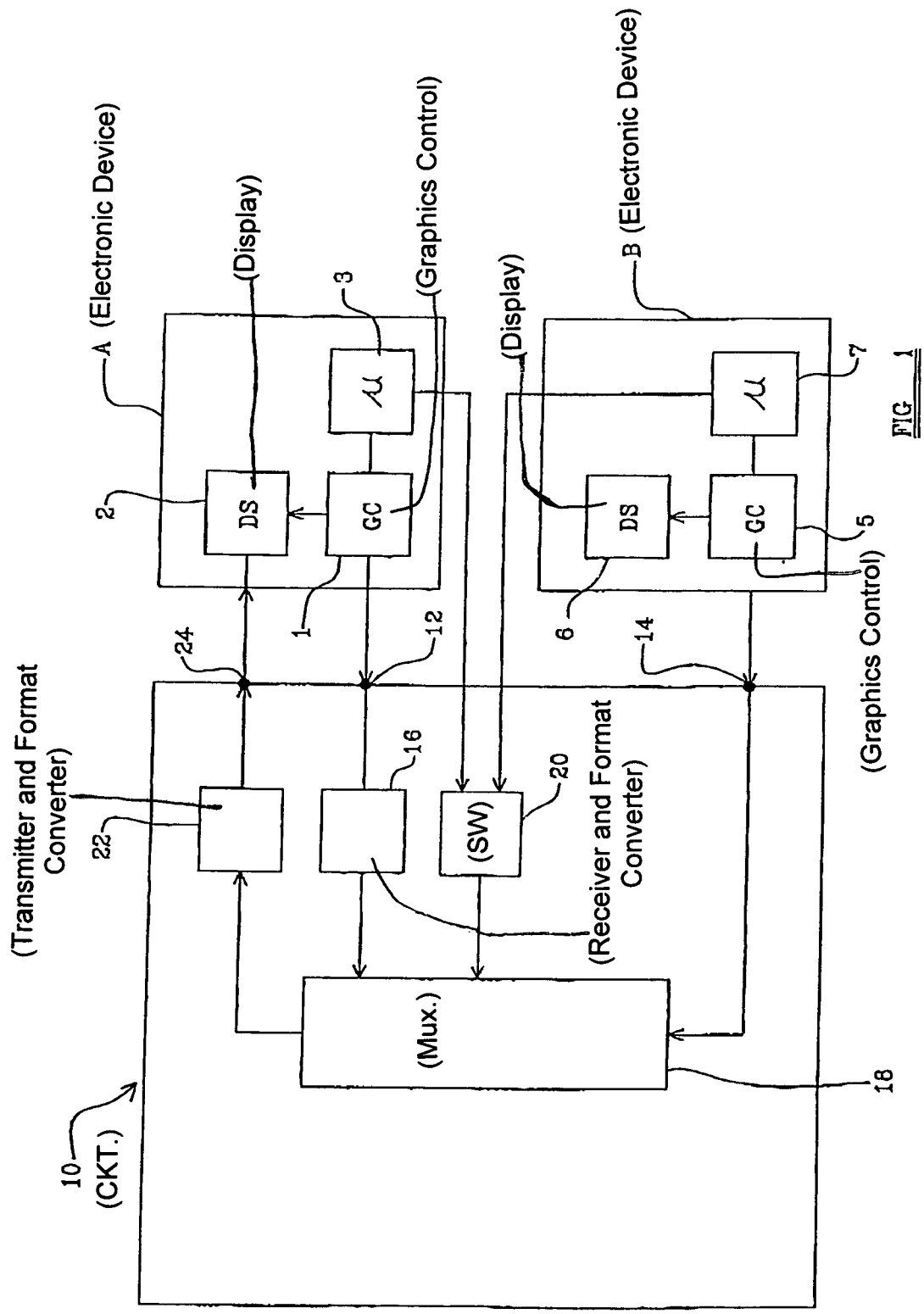
FIG. 1 is a schematic of a circuit of a first embodiment of the invention.

Referring first in particular to FIG. 1, a circuit 10 of a first embodiment of an electronic interface device according to the invention is illustrated schematically. The circuit 10 has a first input 12 for receipt of input signals from the high power graphics controller 1 of the first electronic device A in a first signal format typically Low Voltage Differential Signalling (LVDS), and a second input 14 for receipt of input signals from the graphics controller 5 of the second electronic device B in a second signal format typically Flat Panel Link (FPL). The first input signal is fed to a receiver 16 which converts it to the second signal format, in this case FPL. The first and second input signals, now both in the second signal format FPL, are fed to a multiplexer 18 the output from which is controlled by switch means 20, most conveniently implemented by control logic which acts upon commands from the microprocessor 3 of the first electronic device or the microprocessor 7 of the second electronic device, such that either the first input signal forms the output or the second input signal forms the output. The output from the multiplexer 18 is fed to a transmitter 22 which converts the selected output to the first signal format, LVDS, which is then fed via an output 24 of the circuit 10 to the display screen 2 of the first electronic device A.

Figure 2:
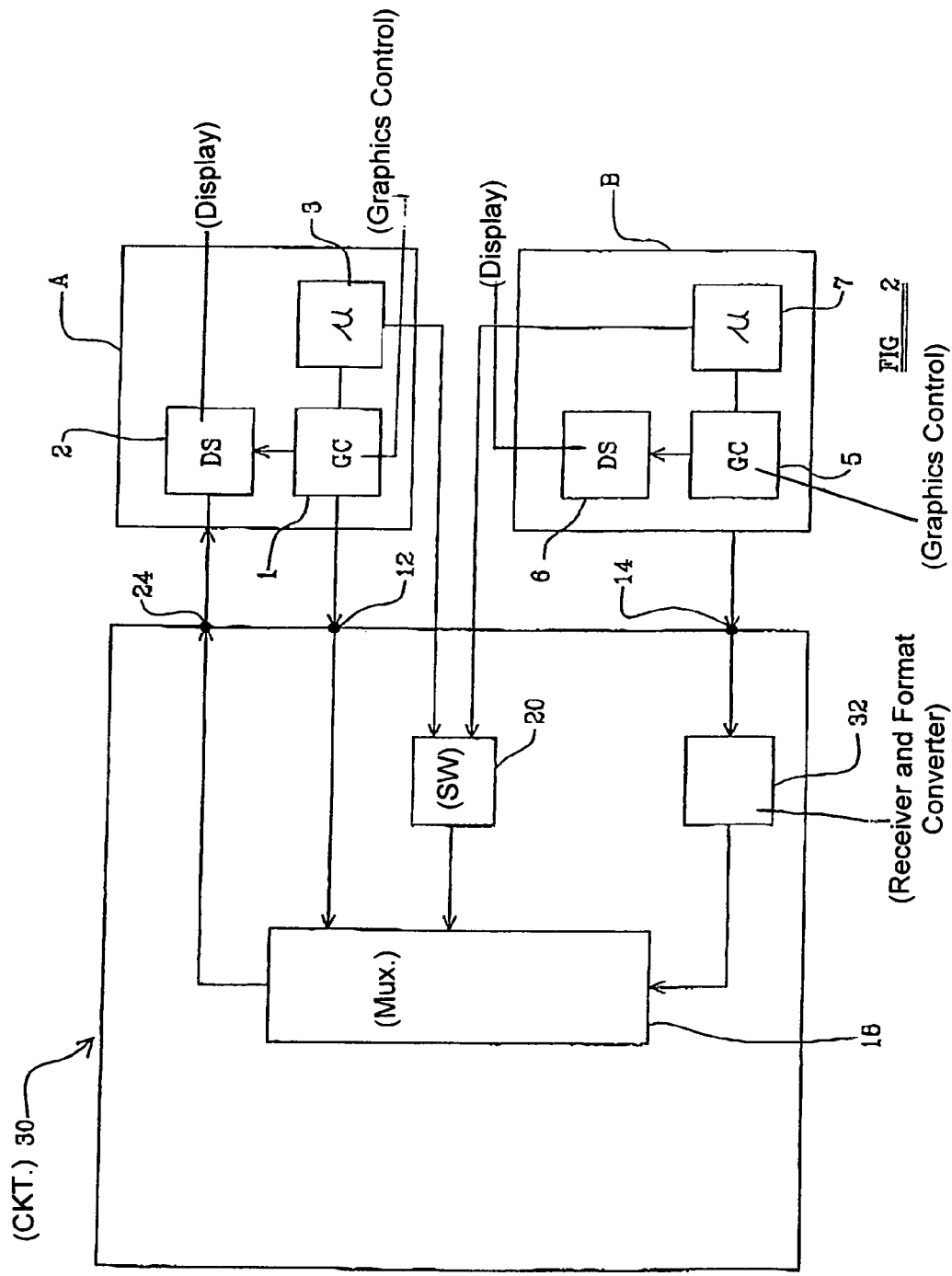
FIG. 2 is a schematic of a circuit of a second embodiment of the invention.

Referring now to FIG. 2, a circuit 30 of a second embodiment of an electronic interface device illustrated schematically, with parts common to the circuit 10 previously described being like referenced. As before the circuit 30 has first and second inputs 12, 14 for receipt of input signals from the graphics controller 1 of the first electronic device A and from the graphics controller 5 of the second electronic device B respectively. The second input signal is fed to a receiver 32 which converts it to the first signal format, in this case LVDS. The first and second input signals, now both in the first signal format LVDS, are fed to a multiplexer 18. The selected output from the multiplexer 18 is fed via an output 24 of the circuit 30 to the display screen 2 of the first electronic device A.

The invention, in either embodiment, provides the advantage that the large display screen 2 of the first electronic device A, such as a notebook computer, may be utilised to display the output from the second electronic device B but without the use of the graphics controller 1 of the first electronic device A with its high power consumption.

Figure 3:
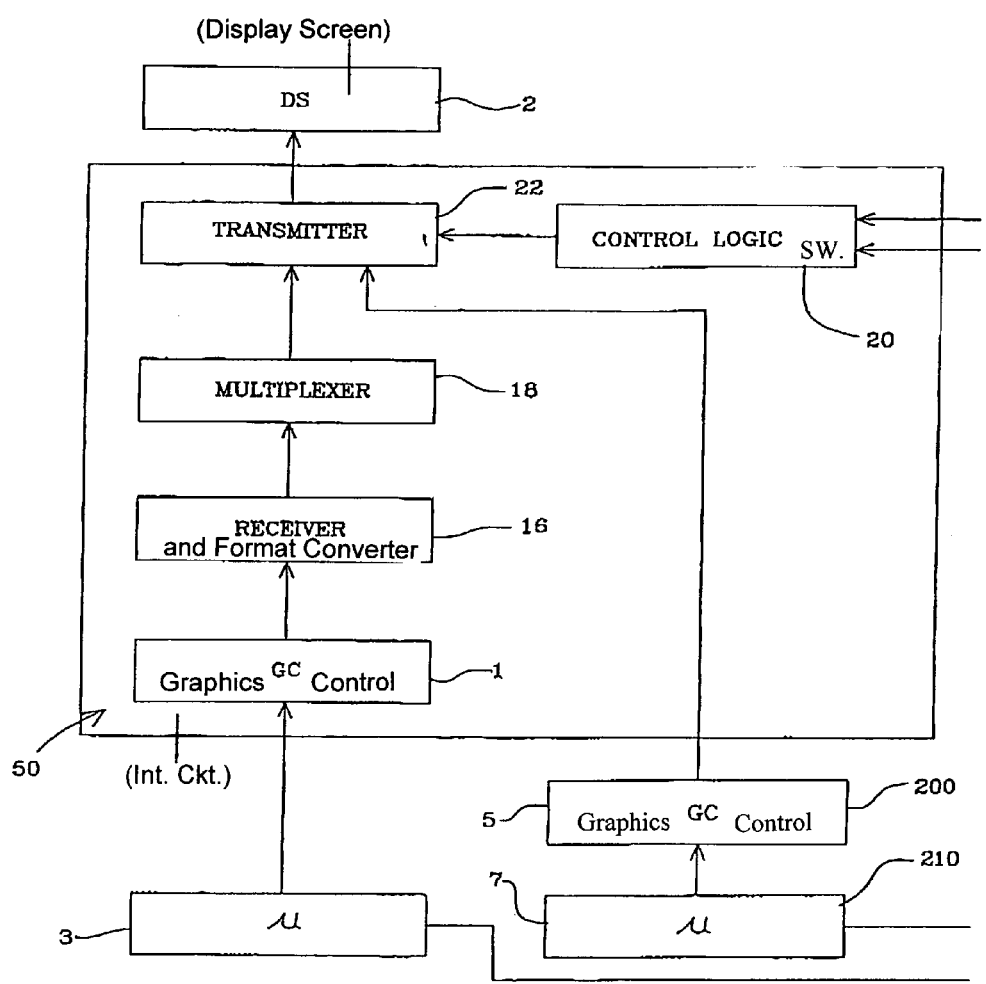
FIG. 3 is a schematic of a possible integrated circuit implementation of an embodiment of the invention.

Referring now to FIG. 3, an example of an integrated circuit implementation of the apparatus is illustrated schematically, with parts common to the previous Figures being like referenced. The invention may be implemented within the first electronic device A, with the high power graphics controller 1, receiver 16, multiplexer 18, control logic 20 and transmitter 22 being implemented on an integrated circuit 50.

Implementation of the invention is not limited to the examples of first and second electronic devices described, but may be used for any combination where the first such device has a larger display screen than the second and thus the advantage is provided. Furthermore it is not limited to the particular signal formats of LVDS and FPL described above. These are simply formats which are at present common for the kinds of electronic devices described, but these will inevitably be superseded by other formats in due course.

It is also envisaged that the second electronic device could also be provided within the outer casing of the first electronic device without a separate display screen of its own. This would enable either device to be operated separately, such that simple functions could be undertaken on the low power consuming PDA while the notebook computer could be powered up for more complex functions.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. Apparatus for enabling information in a first graphics display control signal that a first high-power graphics display controller derives in a first format and a second graphics display control signal that a second low-power graphics display controller derives in a second format to be coupled to a display screen arranged to operate in response to signals in the first format, the first and second graphics display control signals being respectively associated with first and second microprocessors of first and second electronic devices respectively having relatively large and small display screens, the first display screen being the display screen arranged to operate in response to signals in the first format, the first and second microprocessors being arranged for: respectively deriving (a) information included in the first and second graphics display control signals and (b) first and second multiplexer control signals for controlling coupling of information in the first and second graphics display control signals to the display screen of the first device, the apparatus comprising:

a converter arrangement for converting graphics display control signals in one of the formats to graphics display control signals in the other of the formats, a multiplexer, and a controller for the multiplexer, the controller being arranged to be responsive to the first and second multiplexer control signals, the converter arrangement, the multiplexer, and the controller being arranged with each other and arranged to be coupled to (a) the first and second graphics display signals, (b) the first and second multiplexer control signals, and (c) the display screen of the first device for: causing the display screen of the first device to be responsive to signals in the first format to display information in the first and second graphics display control signals at different times without the second graphics display control signal being processed by the first high-power graphics display controller.

2. The apparatus of claim 1 wherein the converter arrangement is arranged to be connected to be responsive to the second graphics display control signal and is arranged to convert the second graphics display control signal into the first format to supply information in the second graphics display control signal to a first input of the multiplexer in the first format, the multiplexer having a second input arranged to be responsive to the first graphic display control signal and to supply, at different times, under control of the first and second multiplexer control signals, to the display screen of the first device information in the first and second graphics display control signals in the first format.

3. The apparatus of claim 1 wherein the converter arrangement includes a first converter for converting signals in the first format to the second format, and a second converter for converting signals in the second format to the first format, the first converter being arranged to be responsive to the first graphics display control signal for converting the first format of the first graphics display control signal to a signal in the second format and for coupling a signal in the second format and including information in the first graphics display control signal to a first input of the multiplexer, the multiplexer having a second input arranged to be responsive to the second graphics display control signal, the multiplexer being arranged to supply, at different times, under control of the first and second multiplexer control signals, to the second converter, information in the first and second graphics control signals in the second format, the second converter being arranged to supply, at different times, to the display screen of the first device, information in the first and second graphics display control signals in the first format.

4. The apparatus of claim 1 in combination with first and second high and low powered graphics controllers arranged to be respectively responsive to information in signals derived by the first and second microprocessors for deriving the first and second graphics display control signals.

5. The apparatus of claim 4 wherein the first and second formats are respectively the low-voltage differential signaling (LVDS) and the flat-panel link (FPL) formats.

6. The apparatus of claim 5 in combination with the first electronic device including the first microprocessor, the first graphics controller, and the display screen of the first device arranged to be also responsive to signals in the first format as derived from the first graphics controller, and the second electronic device including the second microprocessor, the second graphics controller, and a display screen arranged to be responsive to signals in the second format as derived from the second graphics controller.

7. The apparatus of claim 2 in combination with the first electronic device including the first microprocessor, the first graphics controller, and the display screen of the first device arranged to be also responsive to signals in the first format as derived from the first graphics controller, and the second electronic device including the second microprocessor, the second graphics controller, and a display screen arranged to be responsive to signals in the second format as derived from the second graphics controller.

8. The apparatus of claim 3 in combination with the first electronic device including the first microprocessor, the first graphics controller, and the display screen of the first device arranged to be also responsive to signals in the first format as drive from the first graphics controller, and the second electronic device including the second microprocessor, the second graphics controller, and a display device screen arranged to be responsive to signals in the second format as derived from the second graphics controller.

9. The apparatus of claim 8 wherein the first electronic device is a portable computer that can be carried with one hand and the second electronic device is a personal digital assistant (PDA) or a mobile telephone.

10. The apparatus of claim 7 wherein the first electronic device is a portable computer that can be carried with one hand and the second electronic device is a personal digital assistant (PDA) or a mobile telephone.

11. The apparatus of claim 6 wherein the first electronic device is a portable computer that can be carried with one hand and the second electronic device is a personal digital assistant (PDA) or a mobile telephone.

12. The apparatus of claim in 1 wherein the converter arrangement, multiplexer and controller are on an integrated circuit including a graphics controller arranged to be responsive to a signal that the first microprocessor is arranged to derive and includes information in the first graphics display control signal.

13. A method of coupling information in a first graphics display control signal derived from a first electronic device having a relatively large display screen in a first format and a second graphics display control signal derived from a second electronic device having a relatively small display screen in a second format to the screen of the first device that operates in response to signals in the first format, the first and second graphics display control signals being respectively derived by relatively high and low power controllers and associated with first and second microprocessors of the first and second devices, the first and second microprocessors respectively deriving (a) information included in the first and second graphics display control signals and (b) first and second multiplexer control signals that control coupling of information in the first and second graphics display control signals to the display device, the method comprising:

converting graphics display control signals in one of the formats to graphics display control signals in the other of the formats, a multiplexing step, and controlling the multiplexing step in response to the first and second multiplexer control signals, the converting, multiplexing and controlling steps responding to (a) the first and second graphics display signals, and (b) the first and second multiplexer control signals to: cause the display screen of the first device to be responsive, at different times, to signals in the first format to display information in the first and second graphics display control signals at different times.

14. The method of claim 13 wherein the converting step responds to the second graphics display control signal to convert the second graphics display control signal into the first format and supply information in the second graphics display control signal to a first input of the multiplexing step in the first format, the multiplexing step having a second input responsive to the first graphic display control signal and to supply, at different times, under control of the first and second multiplexer control signals, to the display screen of the first device, information in the first and second graphics display control signals in the first format.

15. The method of claim 13 wherein the converting step includes a first sub-step of converting signals in the first format to the second format, and a second sub-step of converting signals in the second format to the first format, the first converting sub-step being responsive to the first graphics display control signal and converting the first format of the first graphics display control signal to a signal in the second format and coupling the signal in the second format and including information in the first graphics display control signal to a first input of the multiplexing step, the multiplexing step having a second input responsive to the second graphics display control signal, the multiplexing step supplying, at different times, under control of the first and second multiplexer control signals, to the second converting sub-step, information in the first and second graphics control signals in the second format, the second converting sub-step supplying, to the display screen of the first device, at different times, information in the first and second graphics display control signals in the first format.

16. Apparatus for enabling information in a first graphics display control signal in a first format and a second graphics display control signal in a second format to be coupled to a display device arranged to operate in response to signals in the first format, the first and second graphics display control signals being respectively associated with first and second microprocessors for: respectively deriving (a) information included in the first and second graphics display control signals and (b) first and second multiplexer control signals for controlling coupling of information in the first and second graphics display control signals to the display device, the apparatus comprising:

a converter arrangement for converting graphics display control signals in one of the formats to graphics display control signals in the other of the formats, a multiplexer, and a controller for the multiplexer, the controller being arranged to be responsive to the first and second multiplexer control signals, the converter arrangement, the multiplexer, and the controller being arranged with each other and arranged to be coupled to (a) the first and second graphics display signals, (b) the first and second multiplexer control signals, and (c) the display device for: causing the display device to be responsive to signals in the first format to display information in the first and second graphics display control signals at different times, the converter arrangement including:

a first converter for converting signals in the first format to the second format, and a second converter for converting signals in the second format to the first format, the first converter being arranged to be responsive to the first graphics display control signal for converting the first format of the first graphics display control signal to a signal in the second format and for coupling a signal in the second format and including information in the first graphics display control signal to a first input of the multiplexer, the multiplexer having a second input arranged to be responsive to the second graphics display control signal, the multiplexer being arranged to supply, at different times, under control of the first and second multiplexer control signals, to the second converter, information in the first and second graphics control signals in the second format, the second converter being arranged to supply, at different times, to the display device, information in the first and second graphics display control signals in the first format.

17. The apparatus of claim 16 in combination with
a first electronic device including the first microprocessor, the first graphics controller, and the display device, and
a second electronic device including the second microprocessor, the second graphics controller, and a second display device arranged to be responsive to signals in the second format and derived from the second graphics controller.

18. The apparatus of claim 17 wherein the first electronic device is a portable computer that can be carried with one hand and the second electronic device is a personal digital assistant (PDA) or a mobile telephone.

19. A method of coupling information in a first graphics display control signal in a first format and a second graphics display control signal in a second format to a display device that operates in response to signals in the first format, the first and second graphics display control signals being respectively associated with first and second microprocessors that: respectively derive (a) information included in the first and second graphics display control signals and (b) first and second multiplexer control signals that control coupling of information in the first and second graphics display control signals to the display device, the method comprising:

converting graphics display control signals in one of the formats to graphics display control signals in the other of the formats, a multiplexing step, and controlling the multiplexing step in response to the first and second multiplexer control signals, the converting, multiplexing and controlling steps responding to (a) the first and second graphics display signals, and (b) the first and second multiplexer control signals to: cause the display device to be responsive, at different times, to signals in the first format to display information in the first and second graphics display control signals at different times, the converting step including:

a first sub-step of converting signals in the first format to the second format, and a second sub-step of converting signals in the second format to the first format, the first converting sub-step being responsive to the first graphics display control signal and converting the first format of the first graphics display control signal to a signal in the second format and coupling the signal in the second format and including information in the first graphics display control signal to a first input of the multiplexing step, the multiplexing step having a second input responsive to the second graphics display control signal, the multiplexing step supplying, at different times, under control of the first and second multiplexer control signals, to the second converting sub-step, information in the first and second graphics control signals in the second format, the second converting sub-step supplying, to the display device, at different times, information in the first and second graphics display control signals in the first format.

* * * * *